US012603605B2

(12) United States Patent
Solon

(10) Patent No.: US 12,603,605 B2
(45) Date of Patent: Apr. 14, 2026

(54) PRECONFIGURED DEPLOYABLE SOLAR ENERGY PACKAGE

(71) Applicant: DS2.0, LLC, Portland, TN (US)

(72) Inventor: Dean Solon, Gallatin, TN (US)

(73) Assignee: DS2.0, LLC, Portland, TN (US)

( * ) Notice: Subject to any disclaimer, the term of this patent is extended or adjusted under 35 U.S.C. 154(b) by 0 days.

(21) Appl. No.: 18/625,871

(22) Filed: Apr. 3, 2024

(65) Prior Publication Data

US 2024/0339961 A1 Oct. 10, 2024

Related U.S. Application Data

(60) Provisional application No. 63/494,135, filed on Apr. 4, 2023.

(51) Int. Cl.
*H02S 30/20* (2014.01)
(52) U.S. Cl.
CPC .................................... *H02S 30/20* (2014.12)
(58) Field of Classification Search
CPC .......... H02S 10/40; H02S 20/00; H02S 20/20; H02S 20/30; H02S 20/50; H02S 30/20; F24S 25/61; F24S 25/63; F24S 2025/014; F24S 2030/16
See application file for complete search history.

(56) References Cited

U.S. PATENT DOCUMENTS 5,961,738 A 10/1999 Benton et al.
6,405,494 B1 * 6/2002 Wismeth ................. F24S 25/30
52/173.3

2011/0253193 A1 10/2011 Korman et al.
2016/0173025 A1 6/2016 Korman et al.
2017/0321414 A1 * 11/2017 Merrifield ................. E04C 3/04
2018/0278201 A1 9/2018 Tehan et al.
(Continued)

FOREIGN PATENT DOCUMENTS

CN 110365282 A * 10/2019 ............. H02S 10/40
WO WO-2020229783 A1 * 11/2020 ............. F24S 20/50
(Continued)

OTHER PUBLICATIONS

CN-110365282-A English machine translation (Year: 2019).*
(Continued)

*Primary Examiner* — Andrew J Golden
(74) *Attorney, Agent, or Firm* — Fish & Richardson P.C.

(57) ABSTRACT

In general, this disclosure describes a system and method that includes a set of photovoltaic panels that includes two or more photovoltaic panels electrically coupled together. Each photovoltaic panel has a physical connection with at least one other photovoltaic panel in the set of photovoltaic panels and each photovoltaic panel in the set of photovoltaic panels has a mechanical interface configured to interface with a mounting structure. The system further includes a dispenser that comprises a guide configured to align the physical connection of one or more of the photovoltaic panels in the set of photovoltaic panels with receiving hardware of the mounting structure. The dispenser is configured to house the set of photovoltaic panels and sequentially dispense each photovoltaic panel onto the mounting structure as the dispenser moves along a length of the mounting structure.

9 Claims, 5 Drawing Sheets

(56)     References Cited

U.S. PATENT DOCUMENTS

2020/0274479 A1 * 8/2020 Tehan ..................... H02S 30/20
2025/0286506 A1     9/2025 Solon

FOREIGN PATENT DOCUMENTS

WO     WO-2022149977 A1 * 7/2022 ............. H02S 20/30
WO     WO-2023217330 A1 * 11/2023 ............. H02S 30/20

OTHER PUBLICATIONS

WO-2023217330-A1 English machine translation (Year: 2023).*
WO-2020229783-A1 English machine translation (Year: 2020).*
International Search Report and Written Opinion in International
Appln. No. PCT/US2024/022872, mailed on Aug. 7, 2024, 8 pages.
International Preliminary Report on Patentability in International
Appln. No. PCT/US2024/022872, mailed on Oct. 16, 2025, 7 pages.

* cited by examiner

100

Mechanical Interfaces 112

Photovoltaic Panel 106

Hinged Connections 108

Hinged Wall 104

Electrical Connections 110

Electrical Connector 114

Tow Hook 116

Dispenser 102

Guide 104

Slot 402

400

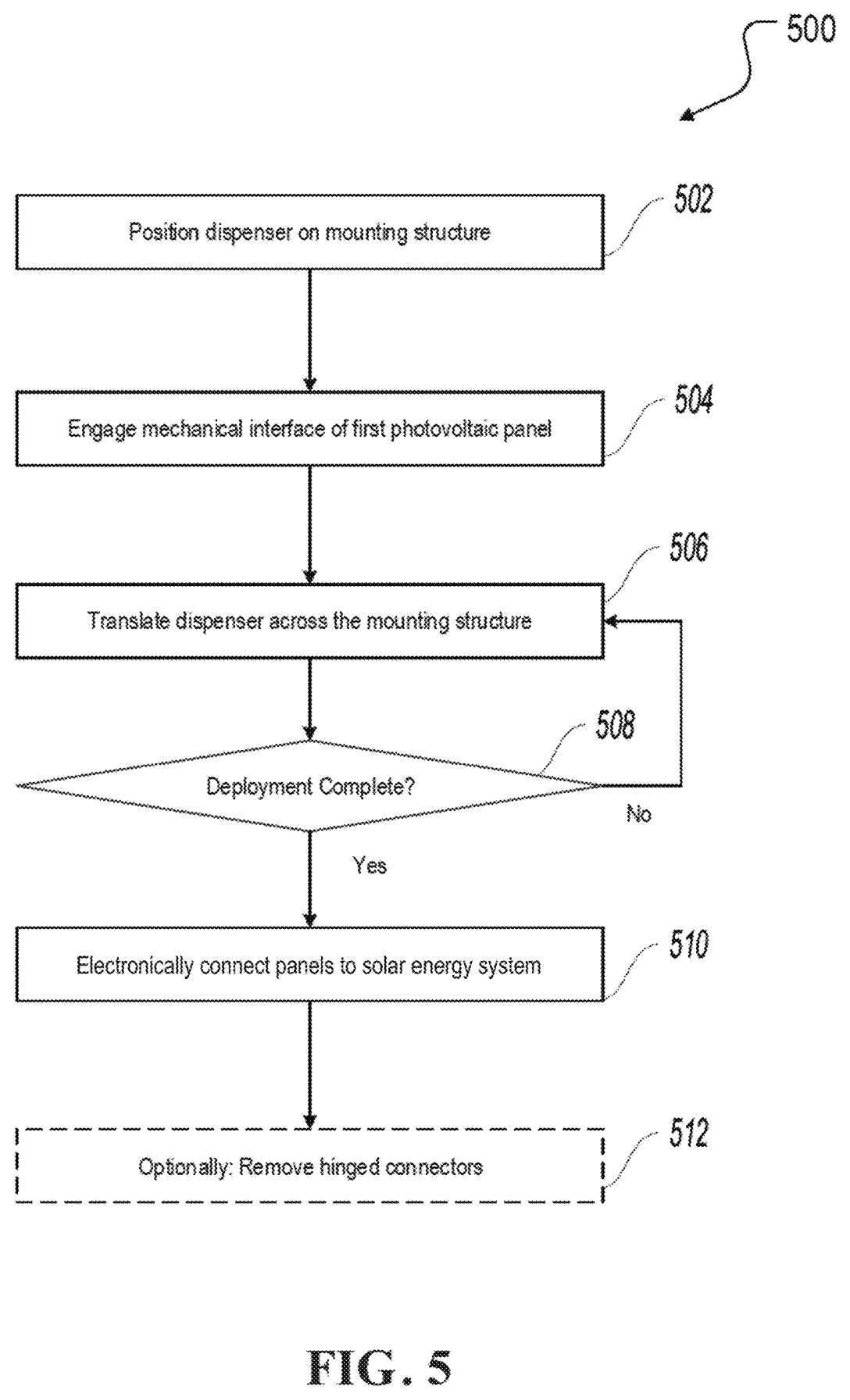

500

| Position dispenser on mounting structure | 502 |

| Engage mechanical interface of first photovoltaic panel | 504 |

| Translate dispenser across the mounting structure | 506 |

Deployment Complete? — 508

No

Yes

| Electronically connect panels to solar energy system | 510 |

| Optionally: Remove hinged connectors | 512 |

FIG. 5

PRECONFIGURED DEPLOYABLE SOLAR ENERGY PACKAGE

CROSS-REFERENCE TO RELATED APPLICATIONS

This application claims priority of U.S. Provisional Application No. 63/494,135 filed Apr. 4, 2023. The contents of the prior application is incorporated herein by reference in its entirety.

BACKGROUND

Solar arrays typically include strings of panels wired in series. Conventionally each panel weighs approximately 20 kg to 50 kg and must be individually installed on a mounting rack. The installer must lift the panel onto the rack, fasten it to the rack, and then electrically connect it to the next panel in series.

SUMMARY

The present disclosure involves systems, methods, and an apparatus for creating, storing, transporting, and deploying a preconfigured solar energy system. The system can include a set of photovoltaic panels that includes two or more photovoltaic panels electrically coupled together. Each photovoltaic panel has a physical connection with at least one other photovoltaic panel in the set of photovoltaic panels and each photovoltaic panel in the set of photovoltaic panels has a mechanical interface configured to interface with a mounting structure. The physical connection between each pair of photovoltaic panels is configured in a manner that enables rotational movement of the pair of photovoltaic panels. The system further includes a dispenser that comprises a guide configured to align the physical connection of one or more of the photovoltaic panels in the set of photovoltaic panels with receiving hardware of the mounting structure. The dispenser is configured to house the set of photovoltaic panels and sequentially dispense each photovoltaic panel onto the mounting structure as the dispenser moves along a length of the mounting structure.

Implementations can optionally include one or more of the following features.

In some instances, the mechanical interface includes a first portion of an automatically engaging fastener configured to mate with a corresponding second portion of the automatically engaging fastener associated with the receiving hardware of the mounting structure. In some instances, the automatically engaging fastener is at least one of Velcro, a push rivet, or a keyhole fastener.

In some instances, the dispenser includes a hinged wall and the hinged wall is configured to open to enable deployment of the set of photovoltaic panels. In some instances, the hinged wall hinges away from other walls of the dispenser and engages one or more rails of the mounting surface.

In some instances, the set of photovoltaic panels are configured to achieve an un-folded configuration after deployment.

In some instances, the physical connection for each photovoltaic panel of the set of photovoltaic panels is a disposable hinge. In some instances, the set of photovoltaic panels is housed within the dispenser in a folded configuration, where the folded configuration includes a plurality of folds at the hinged connections, the folds folded in alternating directions.

In some instances, the dispenser includes a ride mechanism configured to engage one or more rails of the mounting structure.

In some instances, the physical connection between the pair of photovoltaic panels is configured to position the pair of photovoltaic panels over an apex of a structure, where each of the photovoltaic panels is on an opposite side of the apex of the structure.

In some instances, the dispenser is configured to house the photovoltaic panels in a vertical configuration.

The configuration of the disclosed system is advantageous, for example, because it greatly reduces the amount of time, complexity, and labor required to deploy a string of solar panels. Instead of individually lifting, affixing, and wiring each solar panel, a worker need only lift the preconfigured package onto the mounting system, affix a first panel, then slide the package down the mounting system. The sliding action will automatically dispense and affix the remaining solar panels, which are already electrically connected. Additionally, the configuration provides the opportunity for fully autonomous installation, thereby reducing the need for human intervention, which is advantageous because it reduces the likelihood of injury by individuals working on raised solar racking structures, which are also often in extremely remote areas with harsh weather conditions. The configuration also enables more efficient and safe transport of multiple solar panels by housing the solar panels in vertical "accordion" type configuration, the solar panels are less likely to be damaged during transport, and more solar panels can be transported than would be possible if the solar panels were not configured in the disclosed vertical configuration. For example, in this configuration, the solar panels do not bear the weight of any other solar panels, thereby reducing the force placed on each solar panel. The proposed configuration is also advantageous because the container/dispenser includes a hinged wall that eases the unloading of the solar panels, and reduces the likelihood of damage to the solar panels during installation because the panels can slide into place on the mounting structure (e.g., the solar panel racking structure). Furthermore, the container/dispenser includes a guide that enables the entire container/dispenser to engage and securely move across rails of the mounting structure, thereby facilitating the sequential dispensing and installing of the solar panels as the container/dispenser moves along the rails of the mounting structure. This again reduces the likelihood of damage to the solar panels because each solar panel remains in the container/dispenser until the container/dispenser reaches the installation location for that solar panel. As such, the solar panel remains protected by the container/dispenser until the installation for the solar panel is reached.

The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 is a flowchart illustrating an example process for deploying a preconfigured solar energy system.

DETAILED DESCRIPTION

This disclosure describes a preconfigured solar energy system that can be readily deployed with reduced time and labor. At a high level, the system includes a dispenser that stores a solar string or array, or group of panels during transportation, then aligns them with, and deploys them on a mounting structure. As each panel sequentially deploys from the dispenser, it can engage with the mounting system via an automatically engaging fastener such as a keyhole fastener or a push rivet. The engaged panel can then provide the solar string with mechanical purchase to deploy as the dispensing system is moved along the mounting system.

Figure 1:
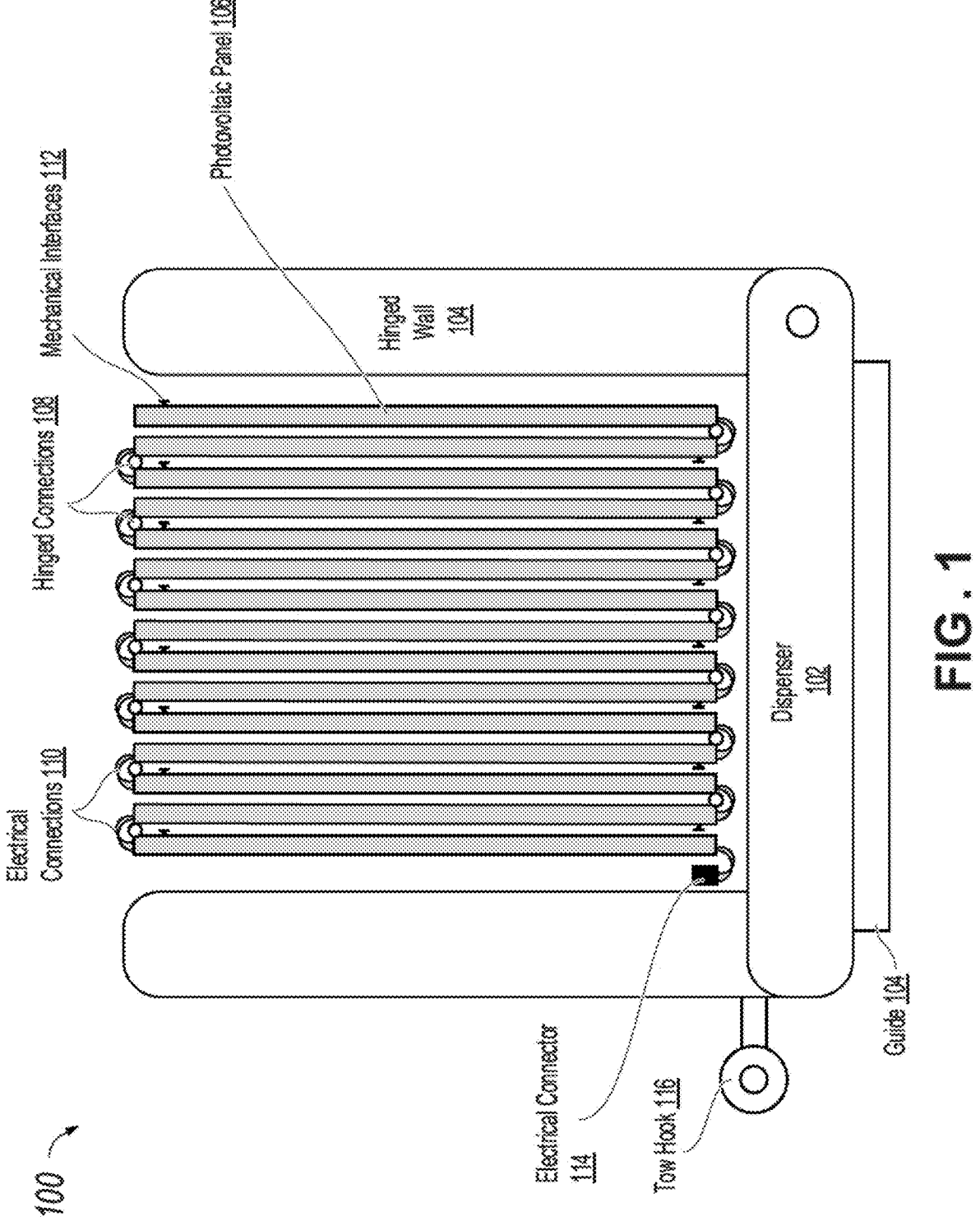
FIG. 1 depicts a side view of a preconfigured solar energy system.

Turning to FIG. 1, a side view of a preconfigured solar energy system 100 is depicted. The system 100 includes a dispenser 102 and a set of photovoltaic panels 106. As discussed in more detail below, the dispenser is configured to contain, store, transport, and deploy the set of photovoltaic panels 106, and can also be referred to as a container for the photovoltaic panels 106.

Dispenser 102 includes one or more guides 104 on a bottom surface of the dispenser 102. The bottom surface of the dispenser 102 is a surface configured to support edges of the photovoltaic panels 106, and is located between vertical walls of the dispenser 102. The guides 104 are shaped to align and support the dispenser 102 when it is located on top of (and in contact with) a mounting structure. In some implementations, the guides 104 include a low-friction surface such as a high-density polyethylene (HDPE) material that allows the dispenser 102 to slide along the mounting system. Guide 104 can include slots, ridges, hooks, or other appropriate components that are positioned to align the dispenser 102 with the mounting system. In some implementations, the guides 104 can include rollers, bearings, or other riding mechanism that act as a roller conveyor for the dispenser 102. In some implementations, the guide 104 can include a motorized roller conveyor, which enables the dispenser 102 to travel along the mounting system and deploy solar panels without the need for external force. Roller conveyors can also be referred to as ride mechanisms.

Dispenser 102 can include a hinged wall 104. The hinged wall 104 can be lowered, and further engage with the mounting system to align the dispenser 102 and the photovoltaic panels 106. In some implementations, the hinged wall 104 includes guides and/or dunnage on its inner surface, which positions photovoltaic panels 106 during deployment and protects them during shipment. In some implementations, when deploying the photovoltaic panels 106, the system 100 is hoisted (e.g., by a forklift) onto the mounting system, then the hinged wall 104 is lowered, and a first panel of the photovoltaic panels 106 is lowered and engaged with the mounting system. In some implementations, the hinged wall 104 is motorized, and automatically lowers in response to a deploy command. The automatically lowering hinged wall 104 may lower a first photovoltaic panel 106 and position it to affix to the mounting system. In some implementations, the hinged wall is connected to a pully system or hydraulic components that enable the hinged wall to slowly lower into contact with the racking system when the hinged wall is unlocked.

In some implementations dispenser 102 is a disposable system, and made from recyclable or readily disposed materials such as cardboard, particle board, plastic, or other material. In some implementations, the dispenser 102 is returnable and/or reusable. In these implementations, the empty dispenser 102 can be returned to the solar panel manufacturer/distributor following deployment. The manufacturer/distributor can then reload the dispenser 102 with more photovoltaic panels 106 and re-ship the dispenser 102.

Each photovoltaic panel 106 can be physically and electrically connected to its neighbor panels in the string by electrical connections 110 and hinged connections 108. Additionally, each photovoltaic panel 106 can include one or more mechanical interfaces 106.

Figures 4A, 4B, 4C:
FIGS. 4A-4C illustrate a cross-section of an example hinge for a preconfigured solar energy system.

The hinged connections 108 can provide mechanical structure that allows folding of the solar string, but enables transfer of tensile loads from panel to panel. In this manner, when the first photovoltaic panel 106 is attached to a mounting system, the remaining panels can be "pulled" from the dispenser by the first panel. In some implementations, hinged connections 108 are temporary or disposable. For example, the hinged connections 108 can be installed for storage, and used during deployment, but then slide off the photovoltaic panels 106 after deployment. FIGS. 4A-4C illustrate a cross-section of an example hinge 400. Hinge 400 can be, for example, polyvinyl chloride (PVC), plastic, or other rubber, and include slots 402 to grip the photovoltaic module. In some implementations, the hinged connections 108 include additional padding or protection for the photovoltaic panels.

Electrical connections 110 can include one or more wires, cables, plugs, or other connectors for electrically connecting each photovoltaic panel 106. The photovoltaic panels 106 are electrically connected before they are stored in dispenser 102, reducing the amount of connections that need to be made during installation or deployment. In some implementations, each electrical connection 110 is a ribbon cable that includes two conductors, a positive and a negative terminal associated with the previous photovoltaic panel 106. In some implementations, the electrical connections 110 include a ground connection, that is electrically grounded, and a positive connection. The photovoltaic panels 106 can be connected in series, parallel, or a combination thereof. For example, one dispenser 102 may store 20 photovoltaic panels 106 connected in series as a single string. In another example, the 20 photovoltaic panels 106 may be connected in two parallel strings of 10 panels. Additionally, more, or fewer panels may be connected. For example, dispenser 102 may store four photovoltaic panels, or 50, or other numbers of panels (e.g., depending on the amount of power to be generated). In some implementations, the panels in a single dispenser can generate at least a megawatt of power (or another amount). The electrical connections 110 can terminate in an electrical connector 114, which can be configured to be connected to the power system associated with the mounting system, or overall power generation system at which system 100 is being deployed. Electrical connector 114 can be, for example, an Amphenol connector, or other multi-pin connector that serves to make an electrical connection between the photovoltaic panels 106 and downstream electrical equipment, such as an inverter or energy storage system.

Mechanical interfaces 112 are located on each photovoltaic panel 106 and are configured to interface with a receiver on the mounting system. Each photovoltaic panel 106 can include one, two, four, or more mechanical interfaces 112. In some implementations, the mechanical interface 106 is a push rivet, keyhole fastener, Velcro, spring latch, or other fastener that can engage with and affix the photovoltaic panel 106. Mechanical interfaces 112 can be positioned such that when coupled with the mounting system, the photovoltaic panels 106 have a limited range of motion, until a subsequent panel is affixed, then they are securely fastened to the mounting system.

In some implementations, dispenser 102 includes a tow hook 116, which can be used to pull or push the dispenser 102 along the mounting system during deployment operations. In some implementations, tow hook 116 folds or collapses into the dispenser 102 to enable more compact shipping.

It should be noted that FIG. 1 is illustrated as an example, and certain elements have been removed or modified for clarity. For example, dispenser 102 may include a cover, which is not shown. Additionally, system 100 is not drawn to any particular scale, and size and dimensions of FIG. 1 are illustrative only. In some implementations, additional protection or dunnage is installed in dispenser 102 with the photovoltaic panels 106. Further, while illustrated as stacked vertically, in some implementations photovoltaic panels 106 may be stacked on their side, or in other configurations (e.g., at an angle, in a crisscross pattern, etc.).

Figure 2:
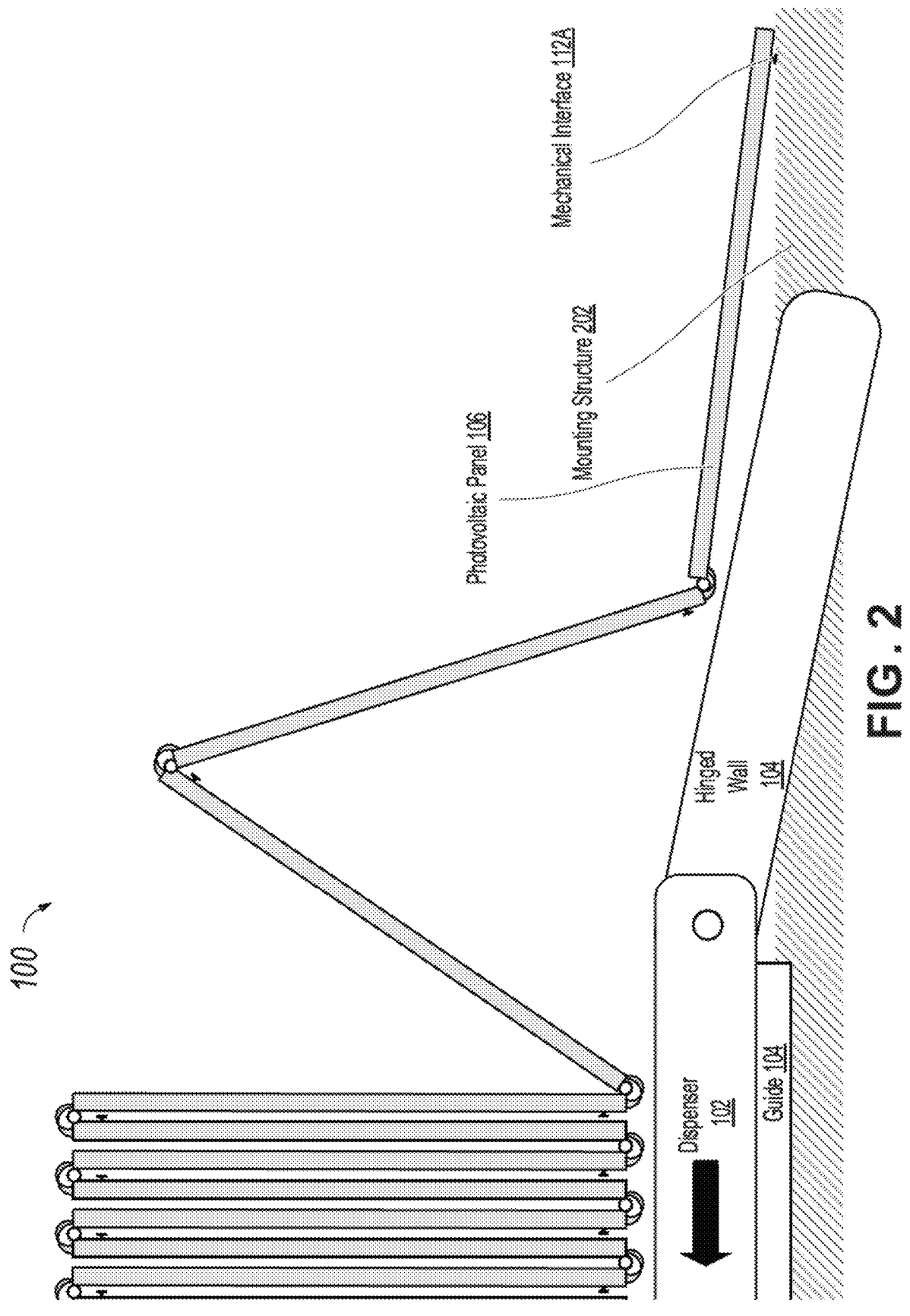
FIG. 2 illustrates a side view of an example preconfigured solar energy system being deployed to a mounting system.

FIG. 2 illustrates a side view of an example preconfigured solar energy system being deployed to a mounting structure (e.g., a solar racking system). In the illustrated example, hinged wall 104 is lowered and engaged with mounting structure 202. Mounting structure 202 can be an aluminum, steel, or other rack system that is designed to position solar panels during operation. In some implementations, mounting structure 202 is configured to tilt, for example, to provide solar tracking. In some implementations, mounting structure 202 is positioned at a fixed angle in order to point mounted solar panels in a preferred direction (e.g., south in the northern hemisphere).

Guide 104 engages with mounting structure 202, and allows dispenser 102 to slide or roll along the mounting structure 202 in the indicated direction. Mechanical interface 112A is illustrated as affixed or partially affixed to mounting structure 202. As dispenser 102 travels down the mounting structure 202, the mechanical interface 112A remains affixed to the mounting structure, which causes each photovoltaic panel 106 to be pulled sequentially out of dispenser 102. In the illustrated example, each photovoltaic panel 106 slides down the hinged wall 104 onto the mounting structure 202, where its mechanical interface can engage the mounting structure 202 and affix that photovoltaic panel 106 to the mounting structure 202.

In this manner, by transiting the mounting structure 202 with the dispenser 102, the entire string of photovoltaic panels can be automatically deployed and affixed to the mounting structure 202 in a sequential manner.

Figure 3:
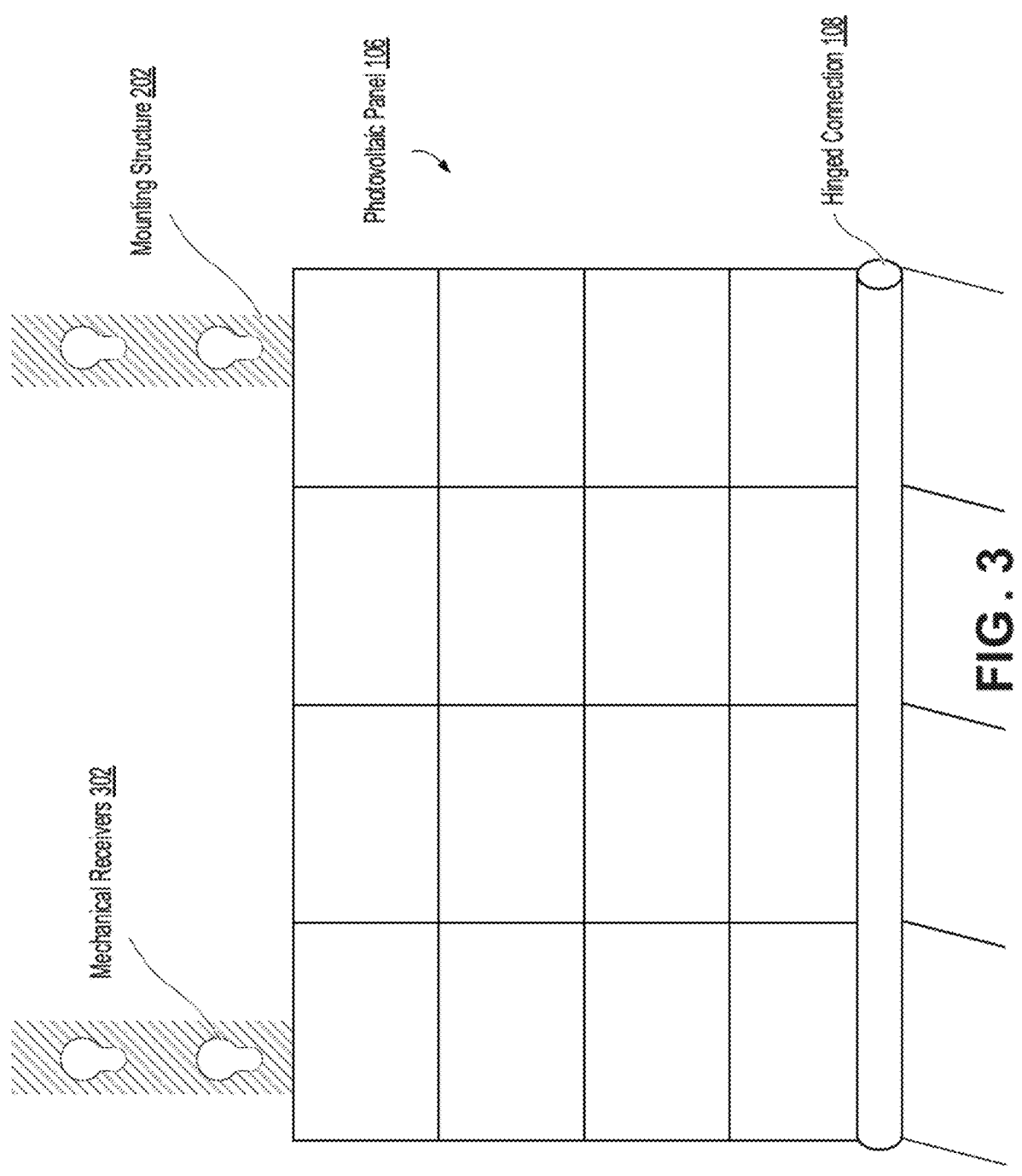
FIG. 3 is a top view of an example preconfigured solar energy system being deployed to a mounting system.

FIG. 3 is a top view of an example preconfigured solar energy system being deployed to a mounting structure 202. In the illustrated example, the mounting structure 202 includes mechanical receivers 302 which are key slots for a pin type mechanical interface on the photovoltaic panel 106 to engage. While mounting structure 202 is illustrated with two rails, it could have three, or more. In some implementations mounting structure 202 includes a single, central rail that is configured to tilt and adjust an angle of attached photovoltaic panels 106. In some implementations, once the photovoltaic panel 106 is affixed to the mounting structure 202, and its neighboring panels are likewise affixed, the hinged connection 108 can be removed (e.g., slid off, or pulled off). In some implementations, the hinged connection 108 remains permanently.

As discussed above, when the photovoltaic panel 106 is pulled across the mounting structure, the mechanical interface will fall into the larger portion of the mechanical receiver 302, and then slide into the smaller portion of the mechanical receiver 302, which secures the photovoltaic panel 106 to the mounting structure and prevents the photovoltaic panel 106 from sliding as the dispenser continues to traverse across the mounting structure 202.

FIG. 5 is a flowchart illustrating an example process 500 for deploying a preconfigured solar energy system. The process 500 can be performed using system 100 as described above with respect to FIG. 1, or other similar systems.

At 502, the dispenser is positioned on a mounting structure. The mounting structure can be a rack, or a brace, or other suitable mechanical structure configured to receive and hold solar panels in place. The dispenser can include guides such that when positioned on the mounting structure, it is aligned and able to roll or slide down the mounting structure while maintaining alignment. The guide can include rollers, a low-friction, self-lubricating material (e.g., HDPE), or other suitable materials. In some implementations.

At 504, a first photovoltaic panel (e.g., solar panel), is deployed, removed, or partially removed from the dispenser and a mechanical interface on the panel is engaged with the mounting structure. This "attaches" the string of photovoltaic panels to the mounting structure, inhibiting movement when the dispenser moves.

At 506, the dispenser is translated along the mounting structure, deploying photovoltaic panels sequentially. As each solar panel is deployed, it can automatically engage with, and attach to, or clip onto the mounting structure. In some implementations, the dispenser is translated along the mounting structure using a line and tow hook. For example, a bobcat, tractor, or other utility vehicle can connect a cable to the dispenser, and pull (e.g., by towing, or using a winch) the dispenser across the mounting structure. In some implementations, the dispenser is self-propelled. For example, the dispenser guides can include powered rollers that drive the dispenser across the mounting structure. In another example, the dispenser might include a cable and winch, which can be affixed to a remote anchor point, and used do pull the dispenser along the mounting structure. This process can continue until deployment is complete (508).

Upon completion of deployment, at 510, the dispenser can be removed from the mounting structure, and the now affixed panels can be electrically connected to the solar energy system. In some implementations, this includes connecting a single "plug" or "connector" into downstream electronics such as an energy storage system (e.g., battery, flywheel system, etc.) or an inverter system. In some implementations, this connection is automatically made. For example, the mechanical interface between each photovoltaic panel and the mounting structure can double as an electrical interface. As such, the electrical connection can be made when the panels engage with the mounting structure.

At 512, optionally, removable hinges are removed from the string of solar panels. For example, where the hinges are removable rubber hinges, they can be pulled off each individual panel. In some implementations, the hinges can be configured to automatically disengage upon the panel string unfolding. For example, once the relative angle between two panels is greater than 160 degrees, the hinge may break, or disconnect and fall to the ground for easy disposal.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A solar energy system comprising:

a set of photovoltaic panels that comprises two or more photovoltaic panels electrically coupled together, wherein:

each photovoltaic panel has a physical connection with at least one other photovoltaic panel in the set of photovoltaic panels;

each photovoltaic panel in the set of photovoltaic panels has one or more mechanical protrusions configured to interface with corresponding receiving slots of a mounting structure; and the physical connection between a pair of photovoltaic panels is configured in a manner that enables rotational movement of the pair of photovoltaic panels; and a dispenser comprising a guide configured to (i) moveably engage with the mounting structure and (ii) cause insertion of the one or more mechanical protrusions of two or more of the photovoltaic panels in the set of photovoltaic panels into the corresponding receiving slots of the mounting structure, wherein the dispenser is configured to house the set of photovoltaic panels and sequentially dispense each photovoltaic panel onto the mounting structure as a portion of the dispenser that continues to house undeployed photovoltaic panels as the dispenser moves along a length of the mounting structure.

2. The solar energy system of claim 1, wherein the dispenser comprises a hinged wall, and wherein the hinged wall is configured to open to enable deployment of the set of photovoltaic panels.

3. The solar energy system of claim 2, wherein the hinged wall is configured to hinge away from other walls of the dispenser and engage one or more rails of the mounting structure.

4. The solar energy system of claim 1, wherein the set of photovoltaic panels are configured to achieve an un-folded configuration after deployment.

5. The solar energy system of claim 1, wherein the physical connection of each photovoltaic panel of the set of photovoltaic panels is a disposable hinge.

6. The solar energy system of claim 5, wherein the dispenser is configured to house the set of photovoltaic panels in a folded configuration, and wherein the set of photovoltaic panels in a folded configuration comprises a plurality of folds at hinged connections, and wherein the plurality of folds are folded in alternating directions.

7. The solar energy system of claim 1, wherein the dispenser comprises a ride mechanism configured to engage one or more rails of the mounting structure.

8. The solar energy system of claim 1, wherein the physical connection between the pair of photovoltaic panels is configured to position the pair of photovoltaic panels over an apex of a structure, wherein each of the photovoltaic panels is on an opposite side of the apex of the structure.

9. The solar energy system of claim 1, wherein the dispenser is configured to house the photovoltaic panels in a vertical configuration.

* * * * *